March 14, 1933.  H. C. KINNEY  1,900,939
APPARATUS FOR SHAPING MOLDING
Filed Aug. 21, 1930  3 Sheets-Sheet 1
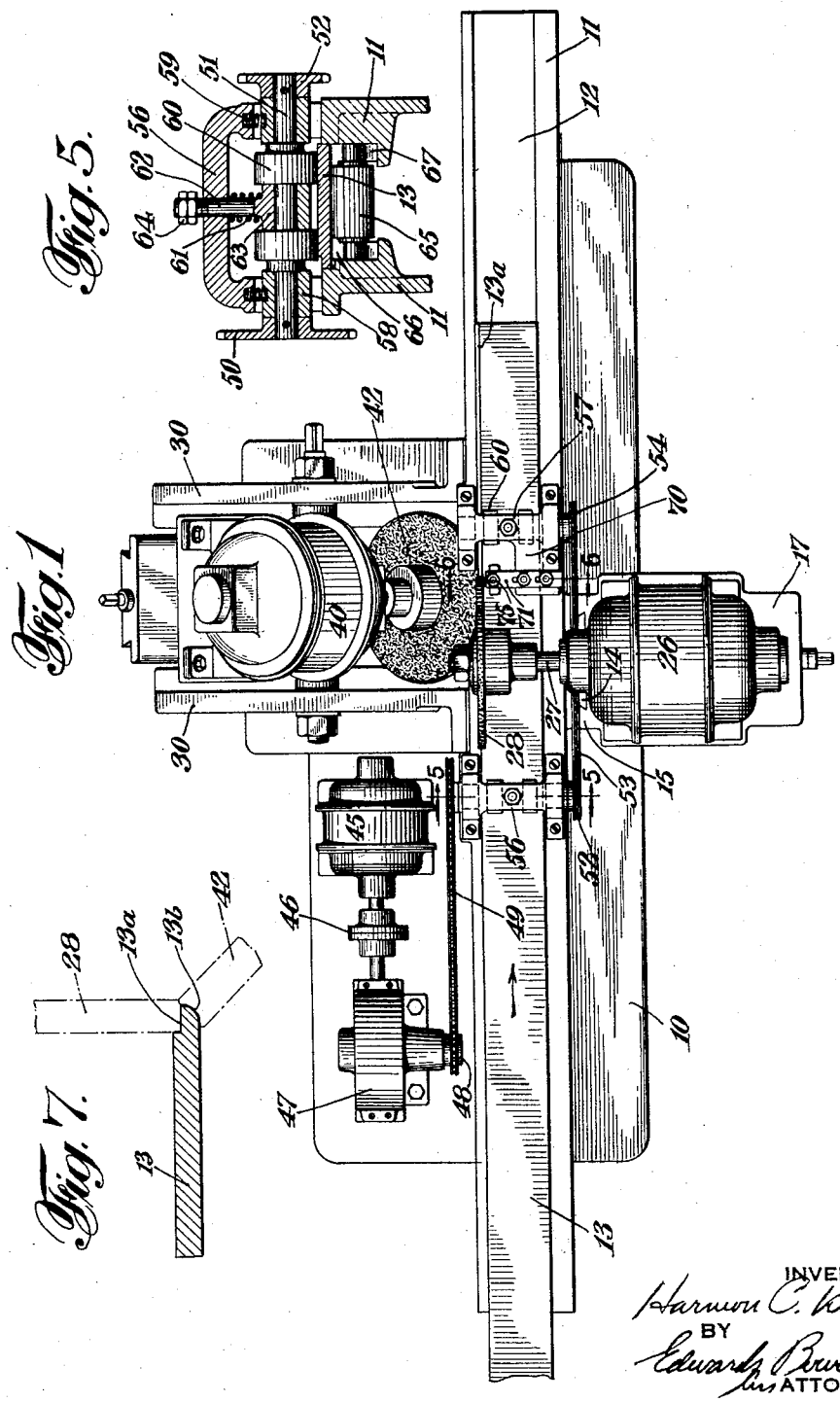
INVENTOR
Harmon C. Kinney
BY
Edwards, Bower & Pool
ATTORNEYS

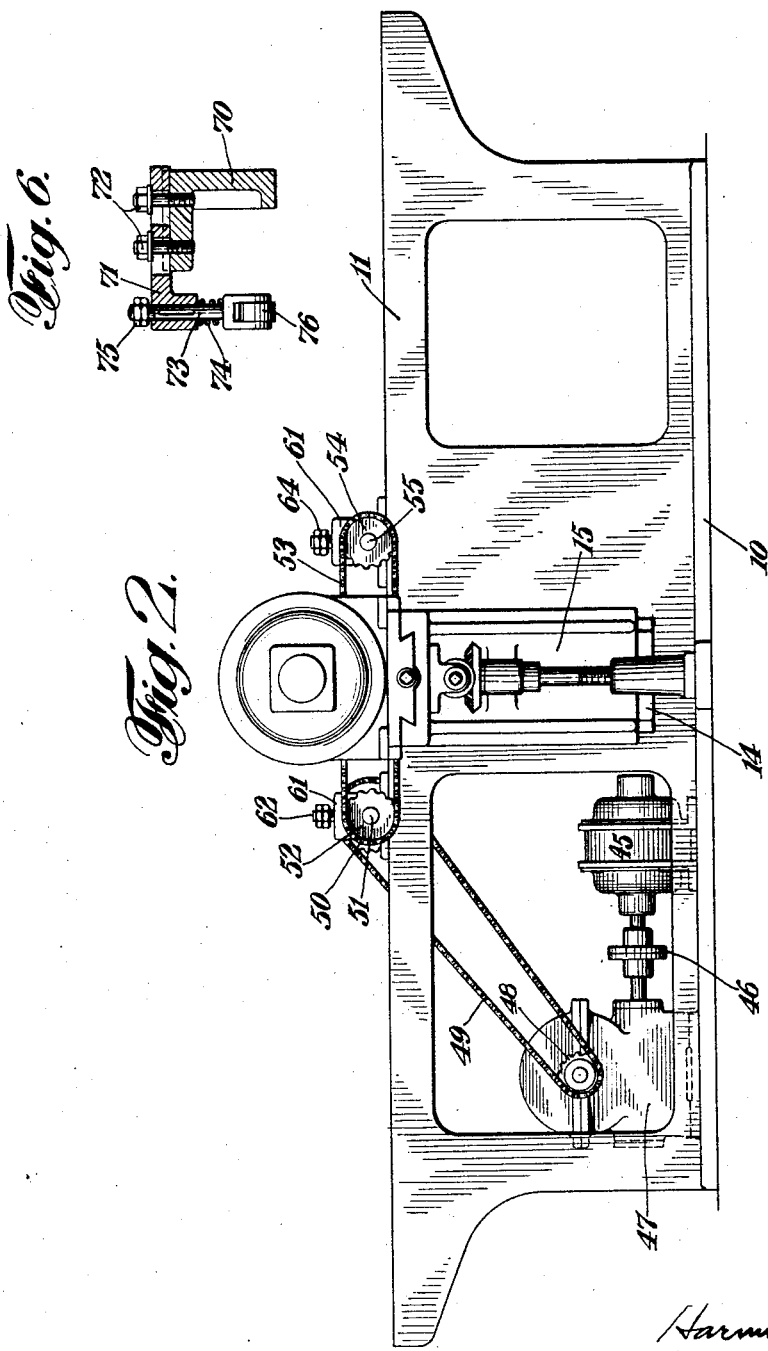

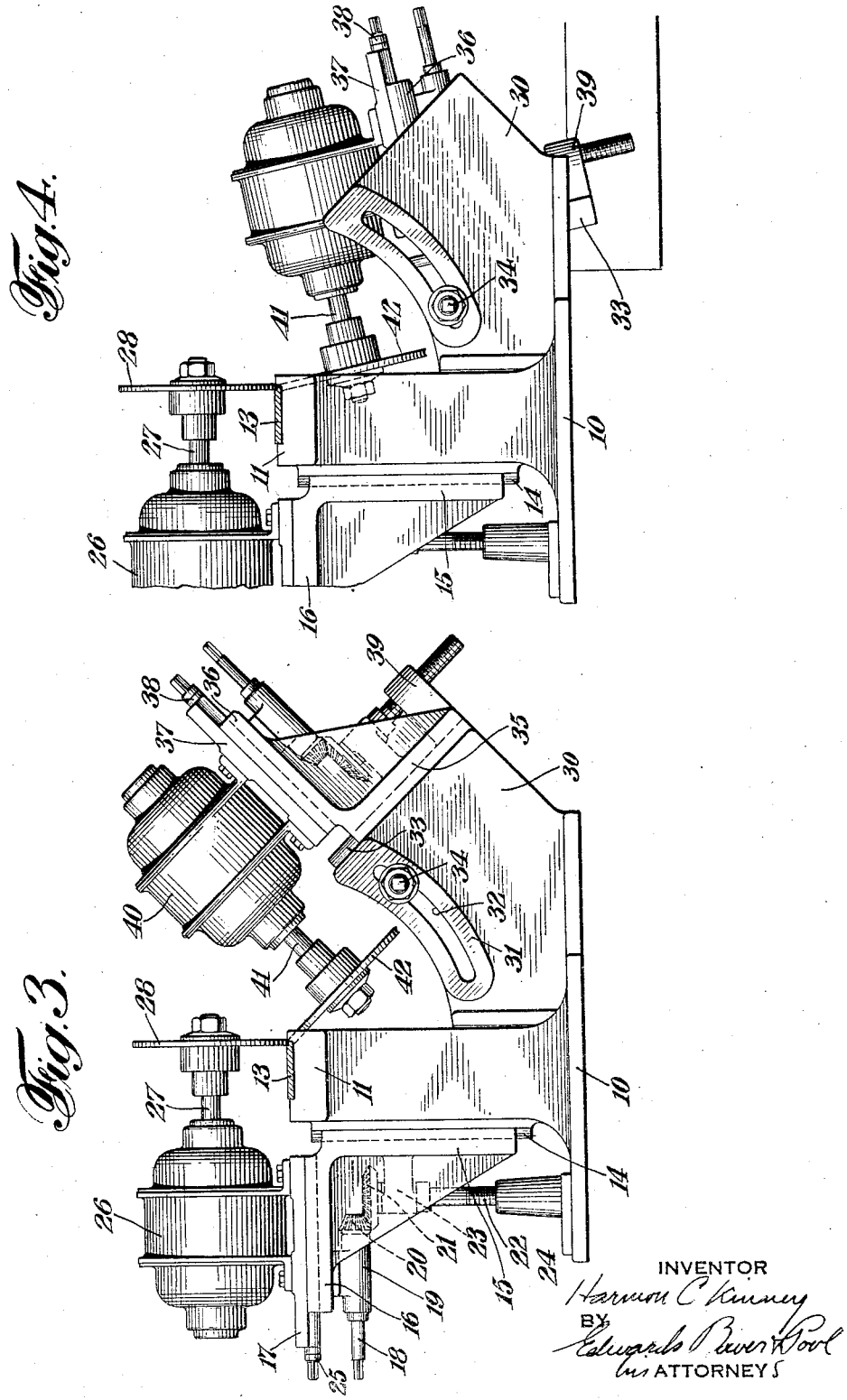

Patented Mar. 14, 1933

1,900,939

UNITED STATES PATENT OFFICE

HARMON C. KINNEY, OF AMBLER, PENNSYLVANIA, ASSIGNOR, BY MESNE ASSIGNMENTS, TO AMBLER ASBESTOS SHINGLE & SHEATHING COMPANY, A CORPORATION OF PENNSYLVANIA

APPARATUS FOR SHAPING MOLDING

Application filed August 21, 1930. Serial No. 476,806.

This invention relates to grinding machines of the type in which a work part is advanced along a platen served by one or more abrader wheel carrying heads.

More specifically the machine is designed to operate on slabs or beams of considerable length, composed of hardened material, and used as bases for tiled walls, etc.

Such beams require careful handling to avoid fracture, must be smoothly and neatly finished at their exposed corners and must be uniformly recessed to receive the edge of the tile layer.

Thus the object of this invention is to provide a machine having means for moving a beam lengthwise past one or more heads carrying cutting or abrading devices which operate on the beam as moved along.

A further feature is in the provision of resiliently mounted means for yieldingly engaging, supporting and advancing a fragile work part with little danger of fracture or other damage.

Another aim is to provide a pair of wheel carrying heads adapted to operate simultaneously, but in spaced planes, one of the heads being vertically and longitudinally adjustable with reference to the platen and the other provided additionally with means for angular adjustment.

Another object is to provide a machine capable of cutting grooves or moulding shapes or both simultaneously on slabs of brittle composition to accurate dimensions throughout their entire length in a rapid and efficient manner.

These and other advantageous features are attained by the novel construction, combination and arrangement of parts hereinafter described and shown in the accompanying drawings, forming part hereof, and in which Fig. 1 is a top plan view of an embodiment of the invention illustrating its application.

Fig. 2 is a front side elevational view of the same.

Fig. 3 is an end elevational view thereof, showing the under cutting wheel head in one angular position.

Fig. 4 is a similar view showing the same head in another angular position.

Fig. 5 is a transverse sectional view taken on line 5—5 of Fig. 1.

Fig. 6 is a transverse sectional view taken on line 6—6 of Fig. 1, and

Fig. 7 is a transverse sectional view of a work part illustrating the relation of the grinding wheels when in operation.

The machine includes a base 10 of considerable width, from which rise standards connected by an elongated bed 11 having a longitudinal groove 12 in its upper surface adapted to guide a work part 13, previously made uniform in width and thickness, and hereafter referred to as a slab.

The central standard has on its front face a vertical pad presenting an undercut guide 14 with which is slidably engaged a right angled bracket 15, having an outstanding extending, horizontally grooved upper surface 16, in which is mounted a slide 17.

The bracket 16—17 is raised and lowered manually by a crank handle applied to the extending end of a spindle 18, carried in a bracket 19 fixed on the underside of the element 16, and at its inner end is provided with a bevel pinion 20 meshed with a gear 21 on the upper end of an upright spindle 22, journalled in a bracket extending from the element 15 in a manner to actuate the same as the screw-threaded portion of the spindle is rotated in a boss 24 raised from the base 10.

Another spindle 25 is supplied for moving the slide 17 towards and from the bed 11, in a well known manner.

Mounted on the slide 17 is an electric motor 26, its shaft 27 having clamped on it an abrading wheel 28 adapted to produce the rabbet or groove 13a in the slab 13 when properly adjusted and the slab moved along.

Carried on the opposite side of the central standard, near its bottom, and partially supported by an extension of the base, is a pair of fixed brackets 30 arranged in opposed relation, these brackets having arcuately concave upper pad portions 31 in which are formed slots 32 curved in accordance with the pads.

Movable between these brackets is a block 33 having a part through which passes a bolt 34 extending through the slots and clamped in adjustment at any point by nuts on the bolt ends.

The outer, angular face of the block is formed as a guide for a knee bracket 35 having an extension 36 in which is mounted a slide 37 actuated by a screw 38, similar to the screw 25, while the bracket 35—36 is moved transversely by geared connections to a screw operating in a lug 39 forming part of the block 33.

Mounted on the slide 37 is another motor 40, its shaft 41 driving an abrading wheel 42, which, due to the adjustability of the motor axis, may assume different angular positions relative to the slab 13, as seen in Figs. 3 and 4, and it is to be noted that the axes of the motors are offset in their planes, the latter being in advance, as shown in Fig. 1.

Mounted on the base 10, at the rear side, is another electric motor 45, its shaft being connected by a coupling 46 with a registering shaft extending from a speed reduction device 47, having a transverse shaft on which is fixed a sprocket 48 driving a chain 49 trained over a sprocket 50 fixed on a shaft 51, having on its opposite, outer end another sprocket 52, in turn driving a chain 53 trained over a sprocket 54.

The shafts 51 and 55, carrying the sprockets 52 and 54, are mounted in similar brackets 56—57 rigidly secured in spaced relation on the bed 11, at substantially equal distances from the axis of the wheel 28.

These shafts are mounted in blocks 58 adjustable vertically in the bearings 56—57, which are normally pressed downwardly by springs 59, causing corrugated feed rolls 60 to engage the upper surface of the slabs, as best seen in Fig. 5.

Further compression on the rolls is supplied by springs 61 encircling studs 62 having hubs 63 at their bottoms and adjusted by nuts 64 at their upper ends.

The slab 13, while guided laterally by the groove 12 of the bed, rests on rolls 65 having pintles movable up and down in recesses 66 in the bed and supported by bent flat springs 67 in the bottoms of the recesses, thus the slabs are floatingly held by spring tension in a manner to yield under strain rather than break, under pressure of the wheel 28 while making the groove 13a.

As the wheel 42 exerts an upward pressure, in rounding or otherwise shaping the outer corner of the slab, see Fig. 7, the device shown in Fig. 6 is used.

This consists of an arm 70 of the front bracket 57, having attached to it a roll carrier 71, slotted to receive clamp screws 72 by which it may be adjusted, the inner end of the carrier having a stem 73 pressed downwardly by a coiled compression spring 74 to the limit of adjusting nuts 75.

The stem 73 is prevented from rotating and is provided at its lower end with a fork in which is rotatably mounted a roll 76 exerting downward pressure on the slab at a point directly over the axis of the wheel 42 when chamfering or otherwise shaping the outer, upper edge of the slab as at 13b.

From the foregoing it will be seen that the slab is held in yielding manner as advanced along its straight path. That the groove 13a may be adjusted for width and depth, and that the outer corner may be given any desirable shape by a proper selection of wheels and the adjustment with which they are provided, in addition to the angles at which the spindle may be disposed.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

I claim:

1. A grinding machine for slabs comprising a bed grooved to receive the slab, means for advancing the slab, a grinder head having vertical and horizontal adjustments to operate on the upper side of one edge of the slab, a second grinder head similarly adjustable to operate in the opposite direction on the other side of said slab, and means for adjustably positioning the second head at variant angles below said bed.

2. A grinding machine for slabs comprising a longitudinally grooved bed to receive a slab, grinding heads adjustably mounted above and below said bed to operate simultaneously on one of its edges and exerting pressures in opposite directions on the same edge of the slab, said heads being arranged in offset relation relative to the bed, a resiliently supported roll in said bed to take the thrust of the upper head, and adjustable resiliently mounted feed rolls impinging on the upper surface of the slab at spaced distances from said thrust roll.

3. A grinding machine for slabs comprising a longitudinally grooved bed to receive a slab, a grinder head adjustably mounted above said bed to produce a flat groove of uniform depth and width in the upper corner portion of the slab, a second grinder head, adjustable at variant angles below the bed, to produce selected shapes on the lower corner of the same edge of the slab, the axes of said heads being transverse to the line of movement of the slab and in longitudinal spaced relation with respect to each other, means for driving said heads independently, and means for moving the slab past said heads.

4. A grinding machine for slabs comprising a longitudinally grooved bed to receive a slab, a grinder head adjustably mounted above said bed to produce a flat groove of uniform depth and width in the upper corner portion of the slab, a second grinder head adjustable in the arc of a circle, the axis of which is represented by the point of application of the grinding element and lower rear edge of the slab, and means for advancing the slab past said heads.

5. In a slab grinder, the combination with a fixed bed grooved to receive a slab and a pair of opposed grinding wheels rotating around horizontal axes and acting to operate simultaneously on the upper and lower longitudinal edges of the slab, of a resiliently mounted roll on said bed to support the slab below said upper wheel, resiliently mounted feed rolls impinging on the upper surface of the slab at spaced distances from said support roll, and means for adjusting the pressure on said feed rolls.

6. In a slab grinder, the combination with a fixed bed grooved to receive a slab and a pair of opposed grinding wheels to operate simultaneously on the upper and lower longitudinal edge of the slab, of a resiliently mounted roll in said bed to support the slab directly below said upper wheel, resiliently mounted feed rolls impinging on the upper surface of the slab at spaced distances from said support roll, a resiliently mounted pressure roll impinging on the surface of the slab at a point above the lower wheel, means for driving said feed rolls, and means for adjusting the pressure on all of the rolls above said bed.

7. In a slab grinder, the combination with a fixed bed grooved to receive a slab of rigid material, means for advancing the slab therealong in said groove as a guide, a roll for grinding a marginal recess on one side edge of the slab to a definite depth and width, and a separate roll for simultaneously grinding a finished surface on the edge opposite the recess, said grinding rolls being offset one from the other.

8. In a slab grinder the combination with a holding and positioning means adapted to retain the slab in a predetermined plane, of means for simultaneously grinding a plurality of different predetermined shapes on the marginal surfaces of the slab at one edge comprising one grinding roll having a cylindrical surface set parallel to said plane and pressing transversely in one direction and acting to form a flat edge surface substantially parallel to the surface of the slab, a second grinding roll with a concave grinding surface set obliquely to said plane and pressing in a generally opposite direction and acting to form the remaining corner of said edge between said flat surface and the opposite side of the slab, driving means for said rolls, and means for producing relative movement between said holding means and said grinding means.

HARMON C. KINNEY.